United States Patent
Smith (10) Patent No.: US 7,082,006 B1
(45) Date of Patent: Jul. 25, 2006

(54) COMPACT OPTICAL TRACKING SYSTEM FOR MAGNETIC TAPE

(75) Inventor: Archibald W. Smith, Boulder, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 09/371,588

(22) Filed: Aug. 10, 1999

(51) Int. Cl.
*G11B 5/58* (2006.01)
*G11B 5/584* (2006.01)
*G11B 5/596* (2006.01)

(52) U.S. Cl. ............... 360/77.01; 360/77.12; 360/77.03; 250/559.29

(58) Field of Classification Search ......... 360/77.12, 360/78.02, 77.03, 78.11
See application file for complete search history.

(56) References Cited

U.S. PATENT DOCUMENTS

| | | | |
|---|---|---|---|
| 4,340,305 A | 7/1982 | Smith et al. | 356/356 |
| 4,945,529 A | 7/1990 | Ono et al. | 369/109 |
| 4,958,245 A * | 9/1990 | Roth et al. | 360/77.03 |
| 5,121,371 A | 6/1992 | Farnsworth et al. | 369/44.26 |
| 5,652,744 A | 7/1997 | Freeman et al. | 369/109 |
| 5,729,519 A | 3/1998 | Nakanishi et al. | 369/109 |
| 6,084,740 A * | 7/2000 | Leonhardt et al. | 360/78.02 |
| 6,128,155 A * | 10/2000 | Sugawara et al. | 360/78.11 |
| 6,141,174 A * | 10/2000 | Judge et al. | 360/76 |
| 6,246,535 B1 * | 6/2001 | Saliba et al. | 360/77.12 |
| 6,275,349 B1 * | 8/2001 | Smith | 360/77.03 |
| 2004/0196771 A1* | 10/2004 | Shimano et al. | 369/112.03 |

FOREIGN PATENT DOCUMENTS

| | | |
|---|---|---|
| DE | 199 13 382 | 10/1999 |
| EP | 311 859 | 4/1989 |
| EP | 344 759 | 12/1989 |
| EP | 895 239 | 2/1999 |
| WO | 99 28909 | 6/1999 |

OTHER PUBLICATIONS

Erlich, Adam; Micro-Optical Integration Spurs Mass Production; Laser Focus World; Mar. 1998; pp. 77-81.
Farnsworth, Stephen W., et al.; Diffractive Optical System For Tracking on Floptical Disks; SPIE vol. 1690 Design of Optical Instruments 1992; pp. 72-79.

(Continued)

*Primary Examiner*—Andrew L. Sniezek
(74) *Attorney, Agent, or Firm*—Yee & Associates, P.C.

(57) ABSTRACT

A compact optical tracking system for magnetic tape is disclosed which is independent of the magnetic format and head structure which can generate a position error signal without encoding on the servo track. A plurality of optical servo modules is arranged in a linear array. Each optical servo module contains an optical beam source, preferably a laser, an optical beam interference composite hologram for producing a predetermined pattern on a target and at least one detector for detecting an optical beam reflection. A position correction signal is generated by one or all of the optical servo modules for re-positioning a magnetic head, which reduces the error in the correction signal from tape degradation and dimensional changes. Reference grating may be added to provide further position calibration prior to the tape being positioned over the head. Refinements to the tracking system include outboard heads which are added for additional position references and which may include index marks for initial positioning in association with a desired servo track.

12 Claims, 7 Drawing Sheets

OTHER PUBLICATIONS

Integrated Optical Tracking System for Magnetic Media; Filed with USPTO on Dec. 2, 1998.

Optical Servo System for A Tape Drive; Filed with USPTO on Dec. 1, 1998.

* cited by examiner

COMPACT OPTICAL TRACKING SYSTEM FOR MAGNETIC TAPE

BACKGROUND OF THE INVENTION

1. Technical Field

The present invention relates to the field of magnetic tape drives. More particularly, the present invention relates to positioning a magnetic head for proper pickup of information tracks on a magnetic tape or disk.

2. Description of Related Art

In magnetic tape drive technology, it is known to employ a tracking servo system to follow pre-written servo tracks on the magnetic tape to accurately position the magnetic heads. Typically, one or more read heads are dedicated to sensing the servo tracks and are added to or interleaved with the data read heads. For example, a combination head with 18 side-by-side data heads may include two or three servo read heads to assure accurate positioning. As the width and spacing of the data tracks is decreased to increase capacity, it becomes more difficult to maintain the necessary positional accuracy using a narrower magnetic servo track. If the width of the servo track is left wider to avoid this problem, some of the potential capacity increase is lost, and the head becomes more complex due to the unequal spacing of the elements. For the magnetic tracking method to work with an unstructured single-element read head, complex encoding of the track and signal processing is required to extract a position error signal.

Previously, optical tracking systems for magnetic tape drives have been proposed which use servo tracks on either the front (magnetic) side or back side of the tape. M. L. Leonhardt and S. D. Wilson disclose in "Optical Servo System For A Tape Drive" U.S. patent application Ser. No. 08/980,723, filed on Dec. 1, 1997, now U.S. Pat. No. 6,084,740 the use of conventional optics with servo tracks on the back of the tape, as well as reference marks on the sides of the magnetic head. This system enables accurate relative positioning of the tape and head without the need for rigid positioning of the optical system relative to the magnetic head. However, the large-scale optics required are difficult to implement in a small form factor drive, typically having limited space adjacent to the magnetic head.

Archibald Smith discloses in "Integrated Optical Tracking System For Magnetic Media", U.S. patent application Ser. No. 09/203,784, filed on Dec. 2, 1998, now U.S. Pat. No. 6,275,349 an optical system which uses miniature optoelectronic modules with servo tracks on the front side of the tape. The opto-electronic modules are integrated into the magnetic head to achieve a compact structure. Both of these systems illuminate a region of the servo tracks with LED light sources and focus the tracks onto a segmented detector that senses their position. Accurate focusing is required, which places stringent dimensional tolerances on the system.

S. W. Farnsworth and S. D. Wilson disclose in "Optical Servo System For Magnetic Disk," U.S. Pat. No. 5,121,371, Filed on Jun. 18, 1990 and again in "Diffractive Optical System For Tracking On Floptical$^R$ Disks," *SPIE*, vol 1960, pp 72–79 (1992), other prior art systems related to optical tracking for floppy magnetic disk drives. Using this system, the need for accurate focusing onto segmented detectors is avoided. This system uses two groups of small light spots. There are typically four to six strong spots in each group, having the same separation as the servo tracks. The two groups are offset in the transverse direction by one quarter of the servo track spacing, and separated in the longitudinal direction. Each group of spots is a fringe pattern produced by the interference of light from a double slit mask or hologram illuminated by a laser. Each group of spots is imaged onto a separate non-segmented detector, whose output varies depending on the position of the fringes relative to the servo tracks. The focal depth for the optical sensors described above is +/−100 um compared to +/−1 um for the previously referenced systems.

Problems associated with the prior art include the continued need for a separate encoding head in order to accurately judge the position of the magnetic head relative to the tape guiding structure. Other problems include inaccurate positioning of the tape head due to dirty or damaged servo tracks on the magnetic tape. Still other problems with the prior art include focusing problems associated with the segmented detectors and slow response or positioning overshoot due to configurations which actuate more than just the mass of the magnetic head. In an effort to solve the above-mentioned problems, the present invention is disclosed.

SUMMARY OF THE INVENTION

A compact optical tracking system for magnetic tape is disclosed which is independent of the magnetic format and head structure, and which can generate a position error signal without encoding on the servo track. A plurality of optical servo modules are arranged in a linear array. Each optical servo module contains an optical beam source, preferably a laser, an optical beam interference composite hologram for producing a predetermined pattern on a target and at least one detector for detecting an optical beam reflection. A position correction signal is generated by one or all of the optical servo modules for re-positioning a magnetic head which reduces the error from tape dimensional changes. Reference gratings may be added to provide further position calibration prior to the tape being positioned over the head. In other embodiments, outboard optical heads are added for use with additional position references, which may include index marks for initial positioning in association with a desired servo track.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
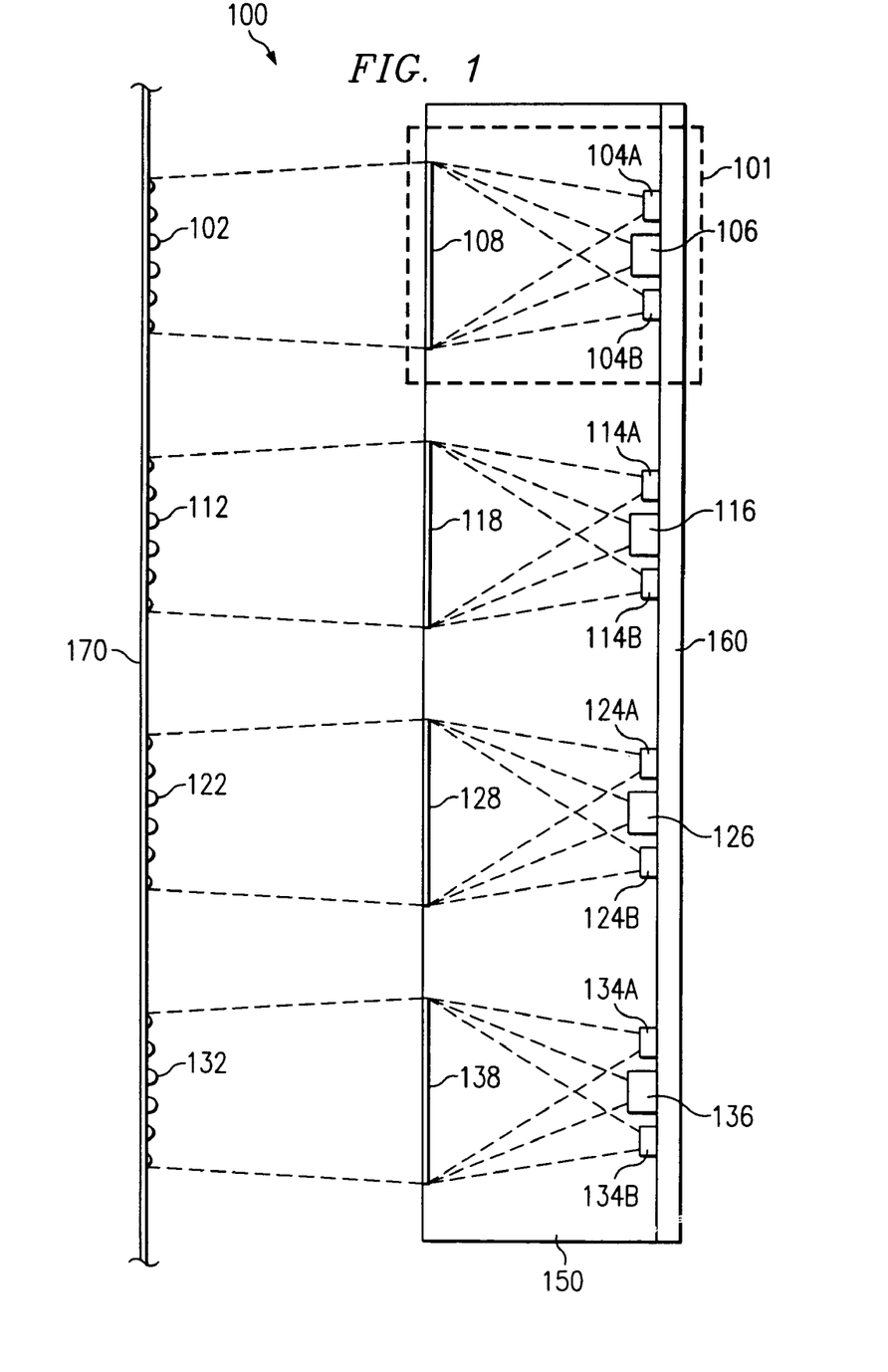
FIG. 1 is a schematic illustrating an optical servo module structure in accordance with a preferred embodiment of the present invention.

FIG. 1 is a schematic illustrating an optical servo module structure in accordance with a preferred embodiment of the present invention. Optical servo module structure 100 comprises a plurality of servo modules in a linear array. Servo module 101 is typical of the servo modules contained in optical servo module structure 100. Servo module 101 contains laser source 106 and detectors 104A and 104B, which are formed in or mounted on substrate 160. Clear plastic block 150 is formed over laser source 106, detectors 104A and 104B, and substrate 160. Composite hologram 108 is formed in or added to clear plastic block 150, approximately perpendicular to the direction of the optical beam projected from laser source 106. The servo modules in optical servo module structure 100 may be independent modules mechanically assembled together to form a single optical servo module structure. However, in a preferred embodiment of the present invention, the individual servo modules are formed together on an single substrate using a semiconductor manufacturing process. Therefore, the alignment and positioning of each servo module is a function of the semiconductor manufacturing process rather than an assembly process.

Laser source 106 projects the optical beam through clear plastic block 150 to composite hologram 108, which interferes with the optical beam and produces a group of spots in fringe pattern 102 on tape 170. Alternatively, laser source 106 could illuminate a double slit mask and create a similar group of spots. Although not specifically detailed in FIG. 1, fringe patterns 102, 112, 122 and 132 actually consist of two groups of spots positioned laterally along the servo track (also not shown) of tape 170. One group of spots in each of fringe patterns 102, 112, 122 and 132 are reflected on detectors 104A, 114A, 124A and 134A, respectively, while the second reflects on detectors 104B, 114B, 124B and 134B, respectively, as will be discussed in detail with respect to FIG. 2 below. Detectors 104A, 104B, 114A, 114B, 124A, 124B, 134A and 134B use the reflected image from fringe patterns 102, 112, 124 and 134 to compute the relative position between optical servo module structure 100 and tape 170, which is in turn used to adjust the alignment between tape 170 and the magnetic tape pickup head, which is affixed to optical servo module structure 100.

Optical servo module structure 100 contains four identical servo modules, each having a laser source and two detectors on the substrate, and a composite hologram, all embedded within the clear plastic. Although optical servo module structure 100 shows four servo modules, any number may be employed in practicing the present invention.

The basic arrangement is shown for the case of a multitrack, combination write and read head with a width less than that of the tape. A linear array of servo modules may be embedded between the write and read head sections. The position of the light spots produced by the modules is referenced to the position of the magnetic head elements during assembly. The tape is positioned laterally by a guiding structure attached to the base of the head. The servo tracks typically have a spacing of 20 um and are written across the tape. When the head is moved or scanned to access a particular group of magnetic tracks, track crossing signals are produced by the A and B detectors. These can be counted to determine the distance moved. An index track (or tracks) with a unique modulation pattern can be used as a reference to the location of the magnetic tracks.

Figure 2:
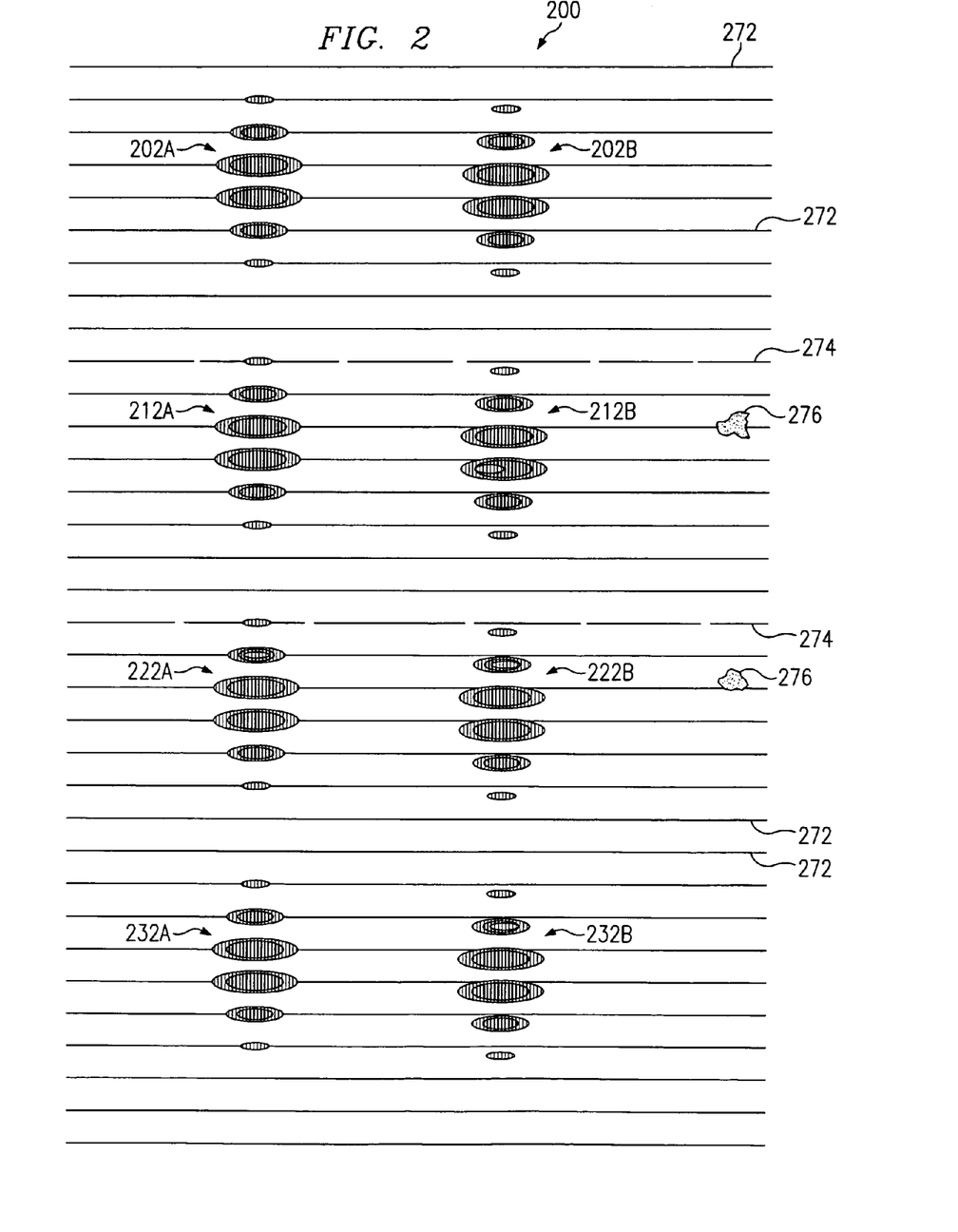
FIG. 2 is a view of the tape as seen from optical servo module structure 100.

FIG. 2 is a view of the tape as seen from optical servo module structure 100. Tape 200 depicts eight groups of spots: fringe patterns 202A and 202B generated by laser source 106 in FIG. 1, fringe patterns 212A and 212B generated by laser source 116, fringe patterns 222A and 222B generated by laser source 126, and fringe patterns 232A and 232B generated by laser source 136. Typically four to six strong spots are present in each group, having the same separation as the servo tracks. However, single spots in A and B suffice for the operation of the modules. The two groups (A and B groups of spots associated with each laser source) are offset in the transverse direction by one quarter of the servo track spacing. Further, the groups are separated in the longitudinal direction. As discussed above, each group of spots is a fringe pattern produced by the interference of light from hologram composites illuminated by a laser source. The reflected light from the tape for each group of spots is directed onto a separate non-segmented detector, whose output varies depending on the position of the fringes relative to the servo tracks.

The use of two groups of spots for each optical servo module allows the direction of offset as well as the magnitude to be extracted. When one set of fringes is centered over a group of dark tracks on the medium, its reflected signal A will be at a minimum. The reflected signal B from the other fringe set will then be approximately 50 percent of the maximum, and in a linear response region. The sign and magnitude of deviations from its average are proportional to the position deviation between the fringes and the dark track center. If the head moves up the distance of a quarter track spacing, as shown in FIG. 2, the roles of the A and B signals are interchanged.

Tape 200 depicts a magnetic tape that is in less than perfect condition. Tape 200 contains a plurality of prewritten servo tracks, including pristine servo tracks 272 and eroded or damaged servo tracks 274. Damaged servo tracks 274 contain small gaps and discontinuities. These defects reflect the projected fringe patterns differently than pristine servo tracks 272, even when the fringe patterns are positioned identically across both the pristine track and the damaged track. Tape 200 also contains surface abnormalities, such as dirt and wear, depicted by flawed tape regions 276.

As the tape moves under the fringe patterns, the effect of damaged servo tracks and surface contamination is averaged out by the multiplicity of fringes in the A and B groups, six fringes each in the example of FIG. 2. Additional averaging is obtained by combining the signals from all A detectors and all B detectors, either in the analog domain or preferably in the digital domain. Averaging of this kind is particularly effective in the case where there is only one strong fringe or illuminated spot in each group. In the event that the servo tracks under one group of fringes are badly degraded, algorithms can be implemented in the digital domain to eliminate the signals from the corresponding A and B detectors from the averaging process. Averaging overall fringe groups also minimizes the effect of dimensional changes in the tape caused by changes in operating temperature and humidity, or by aging of the tape substrate.

Figure 3:
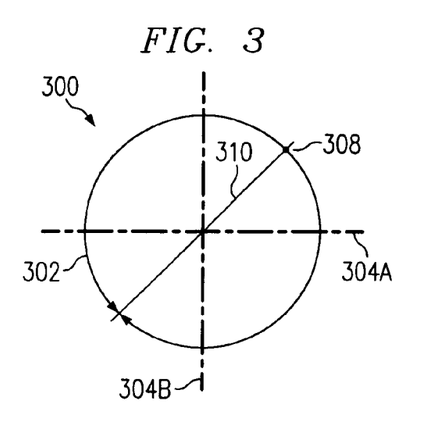
FIG. 3 is a quadrature signal display depicting one detector track crossing signal plotted against the other detector track crossing signal, produced by the optical servo module detectors in accordance with a preferred embodiment of the present invention.

FIG. 3 is a quadrature signal display depicting one detector track crossing signal, plotted against the other detector track crossing signal produced by the optical servo module detectors in accordance with a preferred embodiment of the present invention. The position of the index track after loading the tape onto the head can be found by scanning the head. When the approximate position of the desired magnetic track has been reached by counting the track crossing signals, the head position can be accurately set using signal 304A and signal 304B.

Quadrature display 300 illustrates plotting an output signal from the B detector signal versus an output signal from the A detector signal in the optical servo module. In quadrature display 300, signal 304A and signal 304B trace out circle 302 when the head moves a distance of one servo track spacing. Random motion of the tape within the lateral guiding system produces signal variations over an arc of the circle.

The servo system can be set to move the linear actuator to maintain a particular position on circle 302 corresponding to the center of the magnetic track. For example, operating point 308 is located at the 45-degree position in the upper right quadrant. Linear actuator adjustment indicator line 310 crosses circle 302 at two points, exactly one servo track of adjustment apart, one of which is operating point 308. When the head, and therefore the groups of spots, is out of alignment, the plot of signal 304B versus signal 304A moves along the circle away from operating point 308. By adjusting the linear actuator a scaled amount proportional to distance from operating point 308, the servo tracks change their positions relative to the groups of spots on the tape. In response, the plots of signal 304B versus signal 304A move toward the position of operating point 308.

The servo module closest to the desired track can be selected for optimum accuracy. If a group of tracks is accessed in parallel, interleaved with other tracks and spread across the tape, the multiple servo modules can be used to determine the optimum position for the desired track group by averaging procedures previously discussed.

Figure 4:
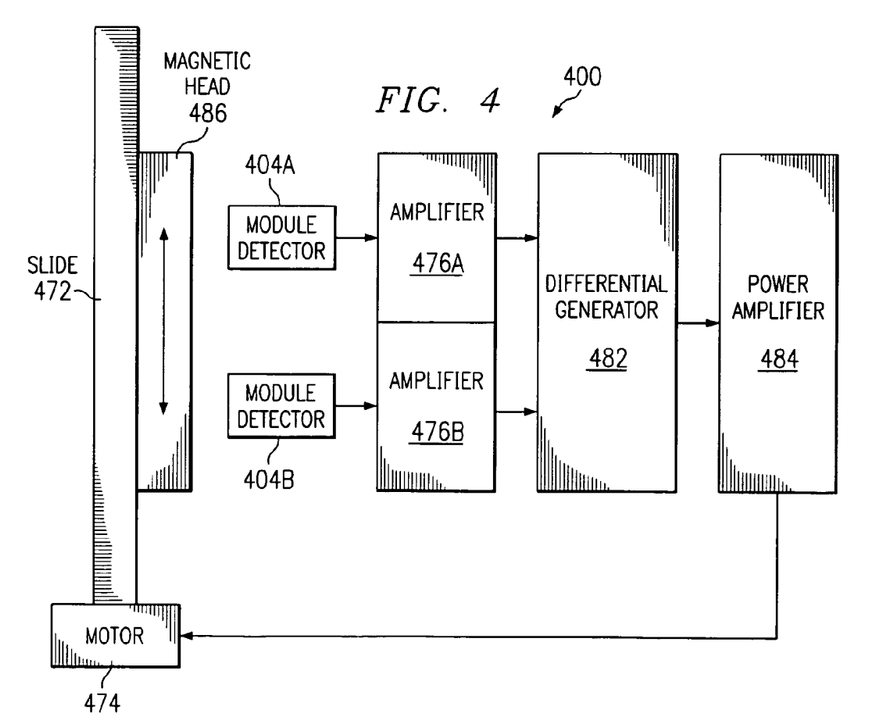
FIG. 4 is a schematic of a servo position control system that may be employed in the present invention.

FIG. 4 is a schematic of a preferred embodiment of a servo position control system that may be employed in the present invention. Initially, in servo position control system 400, module detectors 404A and 404B receive a reflection from groups of spots, such as fringe patterns 202A and 202B, respectively, as shown in FIG. 2. The output signals from module detectors 404A and 404B vary depending on the position of the fringes relative to a group of servo tracks. The output signals from module detectors 404A and 404B are first fed into signal amplifiers 476A and 476B, where the signals are strengthened and passed to difference generator 482. Difference generator 482 compares the output signal from module detector 404B with the output signal from module detector 404A. In a preferred embodiment, the comparison is in the form of an algorithmic position plot producing a quadrature signal display of one detector track crossing signal, plotted against the other detector track crossing signal, as shown in FIG. 3. As the current plot varies from operating point 308 in FIG. 3, a repositioning signal is generated in the form of a motor drive signal.

The motor drive signal is generated by difference generator 482, for correcting the position of magnetic head 486 from its present position to a correctly adjusted position with respect to the servo tracks. The motor drive signal is then fed to power amplifier 484, and the amplified motor drive signal is passed to motor 474, which actuates linear slide 472 for magnetic head 486.

Alternatively, the signals from the detectors may be digitized after amplification, and the motor drive signal generated in the digital domain. When a plurality of servo modules is used, their signals may be combined to optimize the head position in the analog domain, but preferably in the digital domain, as previously discussed.

Prior art embodiments disclose servo modules of 50×15×9 mm in size, too large to allow multiple units to be integrated with a magnetic tape head. A miniaturized version has been developed, about 2×2×2 mm in size (without a mounting pad). It is the purpose of the present invention to show how multiple units of these miniaturized modules can be integrated with a magnetic head to achieve a compact structure that generates stable track position signals. Such signals can be used by a servo system to accurately control the position of a magnetic head relative to the tracks on the tape.

Figure 5A:
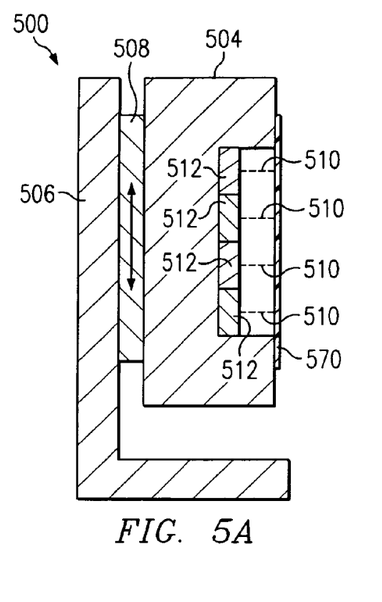
FIGS. 5A, 5B and 5C depict a magnetic head assembly configured with optical servo modules facing the magnetic side of a tape having optical tracks in accordance with a preferred embodiment of the present invention.
Figure 5B:
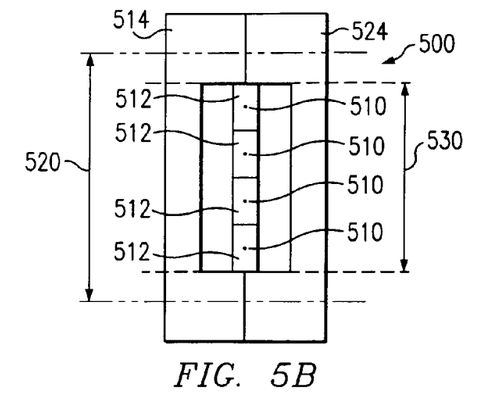
Figure 5C:
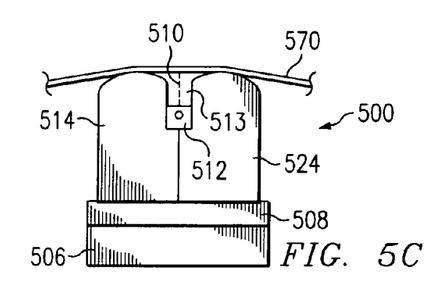

FIGS. 5A, 5B and 5C depict a magnetic head assembly configured with the optical servo modules facing the magnetic side of a tape, having optical tracks in accordance with a preferred embodiment of the present invention. FIG. 5A depicts a side view of assembly 500, showing a cross section through the center of head 504. Assembly 500 comprises a plurality of servo modules 512 emitting optical beams 510 onto tape 570. Modules 512 are recessed within cavity 513 created between the read and write heads in head 504. Head 504 is positioned relative to tape 570 by head actuator 508. Head actuator 508 provides vertical linear movement in the depicted figure between magnetic head 504 and base 506. Note that, in this configuration, only the positions of the head and servo modules are changed by actuator 508, while base 506 remains stationary.

FIG. 5B depicts the face view of assembly 500, including write head 514 and read head 524, which are configured with a recessed area for servo modules 512. Servo modules 512 are shown emitting optical beams 510. Patterned traces 530 show the active head width, while trace 520 depicts the width and position of tape 570 when it is in position across the face of assembly 500.

FIG. 5C depicts the top view of assembly 500, including write head 514 and read head 524, which are configured with a recessed area for placement of the servo modules. Servo module 512 is shown emitting optical beam 510. Assembly 500 is shown with tape 570 in position across the face of write head 514 and read head 524, and in contact with optical beam 510.

In other embodiments of the present invention, other locations for front side servo module array are possible. For example, the modules can be mounted on the side of the head instead of in the middle. For side mounting of optical servo modules, the optical servo modules have to be mounted to the magnetic head at an angle equal to the tape wrap angle.

Assembly 500 depicts the basic arrangement of assembly 100 in FIG. 1, that is, the case of a multi-track combination write and read head with a width less than that of the tape.

A linear array of servo modules (such as optical servo module structure 100) may be embedded between the write and read head sections, as shown in assembly 500. The position of the light spots produced by the modules is referenced to the position of the magnetic head elements during assembly. The tape is positioned laterally by a guiding structure attached to base 506 of the head. The servo tracks typically have a spacing of 20 um and are written across the full width of the tape. When the head is moved or scanned to access a particular magnetic track, track crossing signals are produced by the A and B detectors located in each optical servo module. These can be counted to determine the distance moved. An index track (or tracks) with a unique modulation pattern can be used on the tape as a reference for counting the track crossings. It should be mentioned that in cases where the servo modules are scanned across the tape with the magnetic head, there is only one index track and many servo tracks per head. For such cases, there are only a few index tracks and many servo tracks across the tape.

Figure 6A:
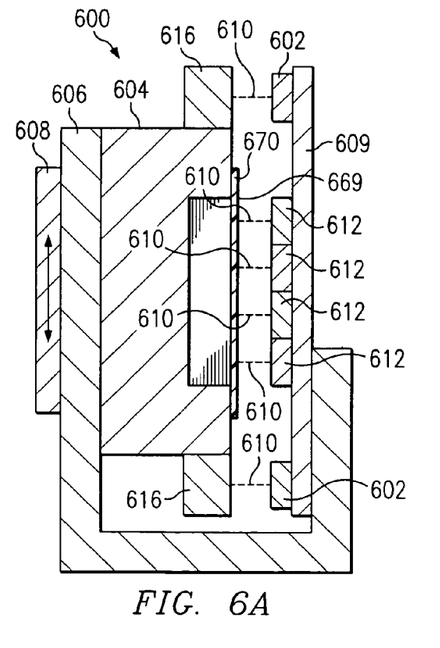
FIGS. 6A, 6B and 6C depict a magnetic head assembly configured with optical servo modules facing the back side of a tape in accordance with a preferred embodiment of the present invention.
Figure 6B:
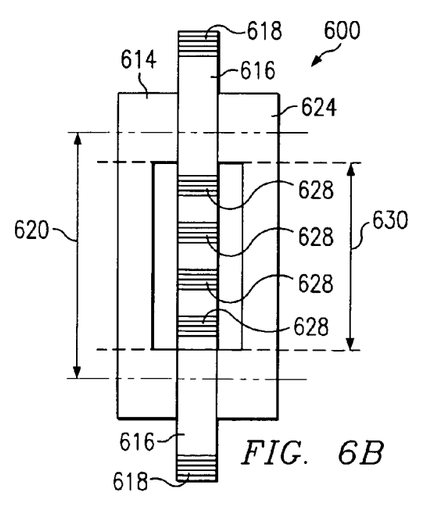
Figure 6C:
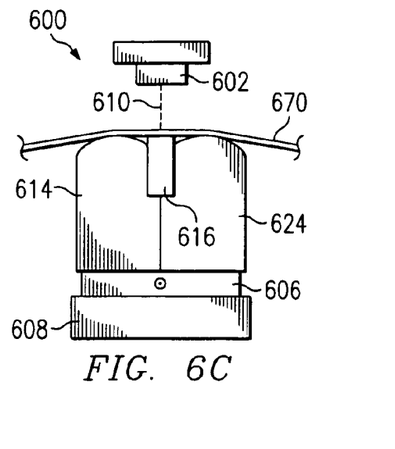

FIGS. 6A, 6B and 6C depict a magnetic head assembly configured with the optical servo modules facing the back side of a tape in accordance with a preferred embodiment of the present invention. FIG. 6A depicts a side view of assembly 600 showing a cross section through the center of head 604. Assembly 600 comprises a plurality of servo modules 612 emitting optical beams 610 onto the back side 669 of tape 670. Note also that structure 600 is equipped with two outboard servo modules 602 that do not project spots onto tape 670, instead servo modules 602 project spots onto reference gratings (not shown) located on reference grating plate 616. Servo modules 612 and 602 are mounted on module structure 609, in contrast to assembly 500, where they are recessed within a cavity created between the read and write heads. Head 604 is positioned relative to tape 670 by head actuator 608. In contrast to the previous embodiment, head actuator 608 provides vertical linear movement for yoke 606 and, in so doing, vertically repositions virtually all of structure 600, including magnetic head 604, module assembly 609, and servo modules 612.

FIG. 6B depicts the face view of assembly 600, including write head 614 and read head 624, which are configured with a recessed area for reference grating plate 616. On reference grating plate 616 are fashioned reference grates 628, which are associated with servo modules 612 and outboard reference grates 618, which are associated with outboard servos 602.

Patterned traces 630 show the active head width, while trace 620 depicts the width and position of tape 670 when in position across the face of assembly 600. Reference grates 628 are only exposed to the optical beams from servo modules 612 prior to tape 670 being positioned across write head 614 and read head 624, while outboard reference grates 618 remain uncovered even when tape 670 is in position.

FIG. 6C depicts the top view of assembly 600, including write head 614 and read head 624, which are configured with a recessed area for placement of the servo modules. Outboard servo module 602 is shown emitting optical beam 610 across tape 670 because the width of the magnetic tape does not extend to the outboard servo modules.

As can be seen in FIGS. 6A–6C, yoke 606 is used to fix optical servo modules 612 to magnetic head 604. As before, assembly 600 is moved with actuator 608 to access various parts of tape 670 and to compensate for random lateral tape motion. In this case, the relative position of servo modules 612 and the index servo track will be sensitive to temperature changes, aging effects, and vibration in assembly 600, including the component attached to yoke 606.

Various reference marks are provided to calibrate and compensate for changes in relative position within the control range of modules 612 (one servo track spacing decreased by the effect of noise). Reference gratings 628 are placed under each optical module in the body of magnetic head 604, aligned with the magnetic tracks. These are used to set the operating position on the quadrature circle before loading tape. The number of lines in each grating is equal to the number of strong fringes produced by the module, typically four or five.

Additional outboard optical modules 602 and outboard reference gratings 618 are provided outboard of tape 670 to monitor changes when the tape is loaded and running, for example, due to temperature variations. If assembly 600 is sufficiently stable, one set of reference marks may be adequate, either inboard optical servo modules 612 or outboard servo modules 602. For the previously mentioned example of 20 um servo track spacing, the total variations must be less than +/−10 um for the system to remain in control without additional alignment methods.

Figure 7:
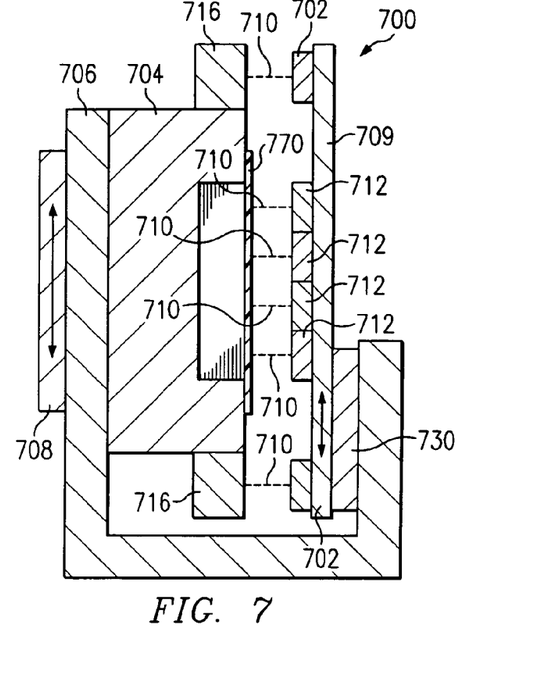
FIG. 7 depicts a magnetic head assembly configured with the back side configuration including a fine actuator in accordance with a preferred embodiment of the present invention.

FIG. 7 depicts a magnetic head assembly configured with the back side configuration, including a fine actuator, in accordance with a preferred embodiment of the present invention. Assembly 700 is a side view showing a cross section through the center of the head. Assembly 700 is similar to assembly 600, including a plurality of servo modules 712 emitting optical beams 710 onto the back of tape 770, and two outboard servo modules 702 projecting onto reference gratings (not shown) located on reference grating plate 716. As in assembly 600, virtually all of structure 700, including magnetic head 704, module assembly 709, and servo modules 712, are moved by head actuator 708. However, assembly 700 further includes fine actuator 730 between yoke 706 and module assembly 709.

In the event that servo modules 712 go out of alignment long term with the magnetic servo tracks by more than one servo track spacing, for example, after several days of operation, the position of the index tracks can be recalibrated by scanning magnetic head 704 and comparing the magnetic and optical signals. If it is desired to set the index servo tracks to a particular position relative to the magnetic tracks to optimize servo accuracy, fine actuator 730 can be used for adjusting the alignment of servo modules 712 relative to magnetic head 704. A compact piezoelectric translator (not shown) can provide a range of a few servo tracks spacing for this purpose.

Figure 8A:
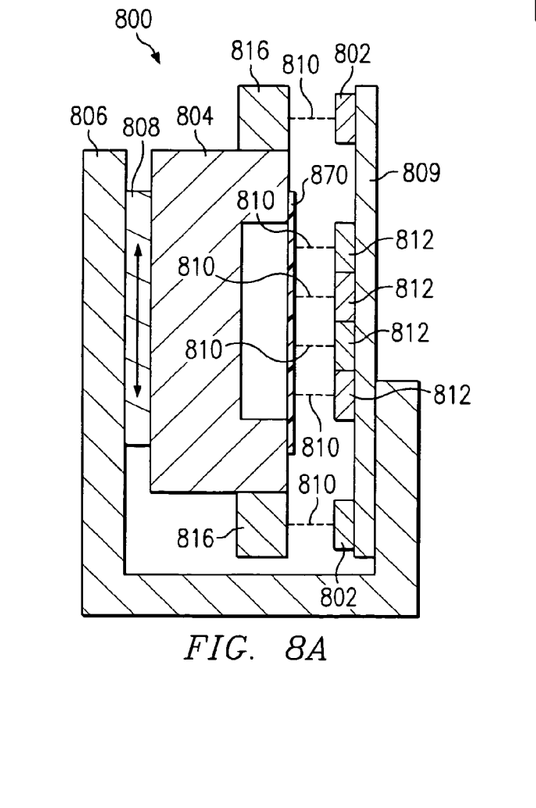
FIGS. 8A, 8B and 8C depict a magnetic head assembly in a back side configuration in which the optical servo modules are not fixed to the magnetic head, and utilizing outboard reference grates including an index reference in accordance with a preferred embodiment of the present invention.

Two ways of mounting the servo modules in the back side configuration exist. The first way is with the servo modules attached to the magnetic head via the yoke so that they move together. Assembly 600 shown in FIG. 6 illustrates this method. The other way of mounting is with the modules fixed to a stationary base so that they are stationary and only the head moves. Assembly 800 shown below in FIG. 8 illustrates this method.

Figure 8B:
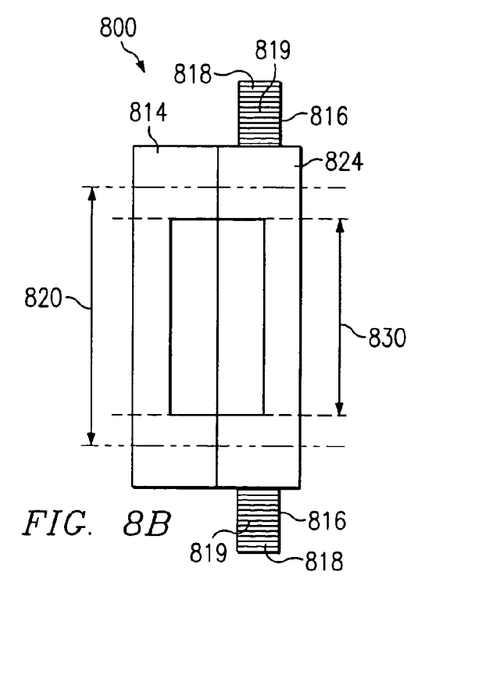
Figure 8C:
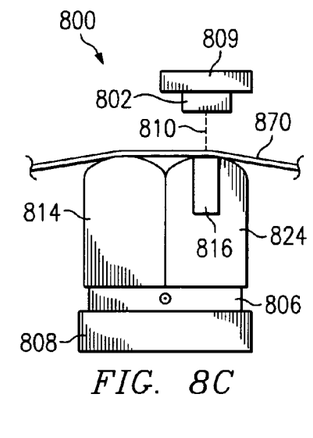

FIGS. 8A, 8B and 8C depict a magnetic head assembly in a back side configuration utilizing outboard reference grates, including an index reference, in accordance with a preferred embodiment of the present invention. In FIG. 8A, assembly 800 is similar to assembly 600, illustrating a side view of assembly 800 showing a cross section through the center of the head. Assembly 800 comprises a plurality of servo modules 812 emitting optical beams 810 onto the back of tape 870. Structure 800 is also equipped with two outboard servo modules 802, which project optical beams that do not project onto tape 870 but, instead, project onto reference grates (not shown) located on reference grating plate 816, as described above in assembly 600.

FIG. 8B depicts the face view of assembly 800, including write head 814 and read head 824. The reference grating plate (shown as reference grates 818) provides two outboard reference grates 818, which are associated with the outboard servos rather than reference gratings under tape 870. Note also that reference grates 818 are positioned adjacent to read head 824 rather than between the read and write heads as depicted by assembly 600 in FIGS. 6B and 6C. Patterned traces 830 show the active head width, while trace 820 depicts the width and position of tape 870 when in position across the face of assembly 800. Outboard reference grates 818 remain uncovered while tape 870 is in position.

In a preferred embodiment, extended outboard reference grates 818 are required to accommodate the movement of the magnetic head relative to the servo modules. Index mark 819 is included in one or each of reference grates 818. Index mark 819 is referenced to the magnetic tracks. On the back side of the tape, only a few tracks are required under each servo module, a few more than the number of strong fringes. Two advantages are provided by this configuration over the embodiment shown in FIG. 7, the first one, namely, outboard gratings 818 act as a position encoder for the linear head actuator, eliminating the need for a separate encoder; and the moving mass of the magnetic head is lower. If the variation in the position of magnetic tape after loading exceeds one servo track spacing, then additional means are necessary to determine the correct head position. An initial portion of the servo tracks can be encoded or patterned so that the integral track offset can be determined from the optical signals. The precise position can then be determined by scanning the magnetic head over one servo track spacing and comparing the magnetic and optical signals.

FIG. 8C depicts the top view of assembly 800, including write head 814 and read head 824. Outboard servo module 802 is shown emitting optical beam 810 across tape 870 in a position adjacent to read head 824.

As can be seen in FIGS. 8A–8C, in the back side configuration, the tape must be inserted between the magnetic head and the servo modules. This separation is typically 2 to 3 mm. Once the tape is inserted, the head assembly can be moved to wrap the tape over the head. The separation can be increased for loading by placing an actuator in the yoke structure, as shown in assembly 900 in FIGS. 9A and 9B for a linear actuator, and as assembly 1000 in FIGS. 10A and 10B for a rotary actuator. This arrangement is feasible for the servo modules fixed to the base, where the additional mass of the opening actuator is not added to the magnetic head.

Figure 9A:
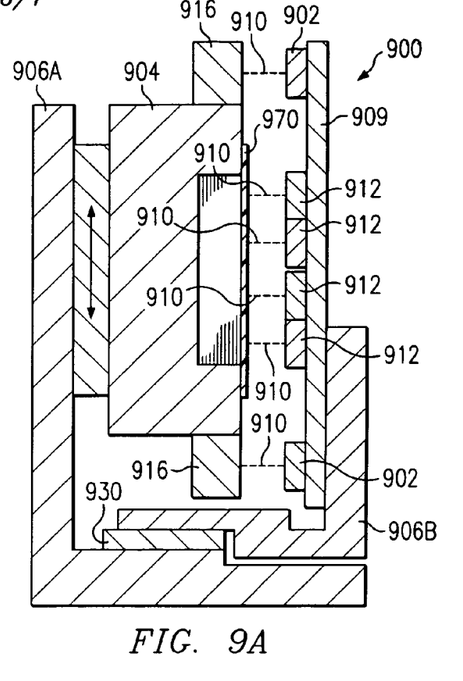
FIGS. 9A and 9B depict a magnetic head assembly in a back side configuration and in the open and closed positions by utilizing a servo module actuator.
Figure 9B:
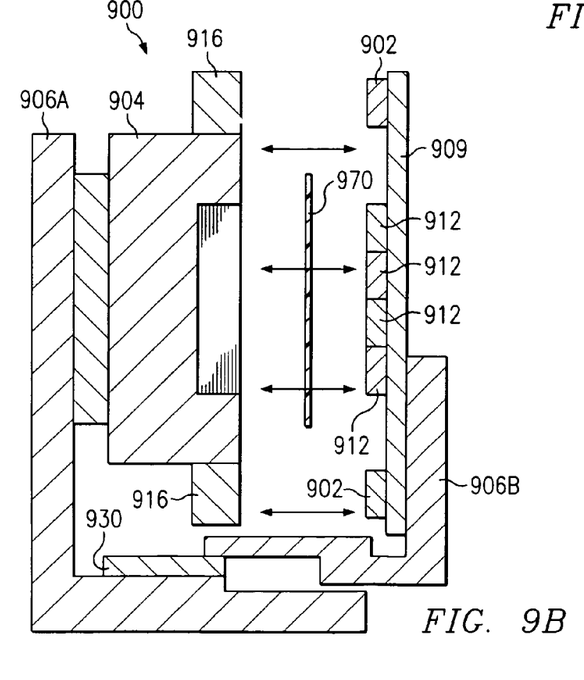

FIGS. 9A and 9B depict a magnetic head assembly in a back side configuration and in the open and closed positions, utilizing a linear actuator. In FIG. 9A, assembly 900 appears in a side view, showing a cross section through the center of head 904. Assembly 900 comprises a plurality of servo modules 912 emitting optical beams 910 onto the back of tape 970. Structure 900 is also equipped with two outboard servo modules 902, which project optical beams that do not project onto tape 970 but, instead, project onto reference gratings (not shown) located on reference grating plate 916. Assembly 900 is shown in the closed position, as described above in assembly 600. In a preferred embodiment of the present invention, the yoke is configured as two cooperating yoke assemblies, head yoke 906A and module yoke 906B. Head yoke 906A and module yoke 906B meet at servo module actuator 930, where module yoke 906B can be opened away from head yoke 906B by activating module actuator 930, as shown in FIG. 9B. Note that the additional mass of the opening actuator is not added to magnetic head 904 but, instead, is affixed between head yoke 906A and module yoke 906B.

Figure 10A:
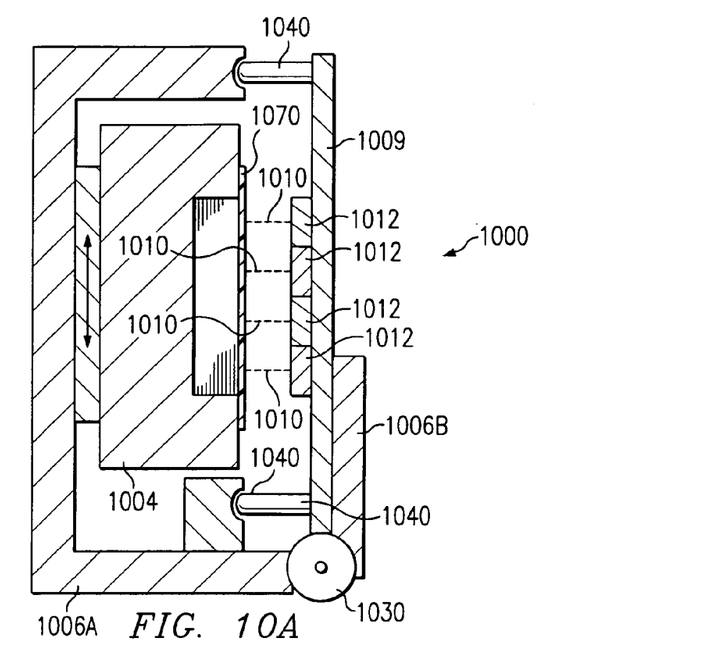
FIGS. 10A and 10B depict a magnetic head assembly in a back side configuration and in the open and closed positions by utilizing a rotary actuator in accordance with a preferred embodiment of the present invention.
Figure 10B:
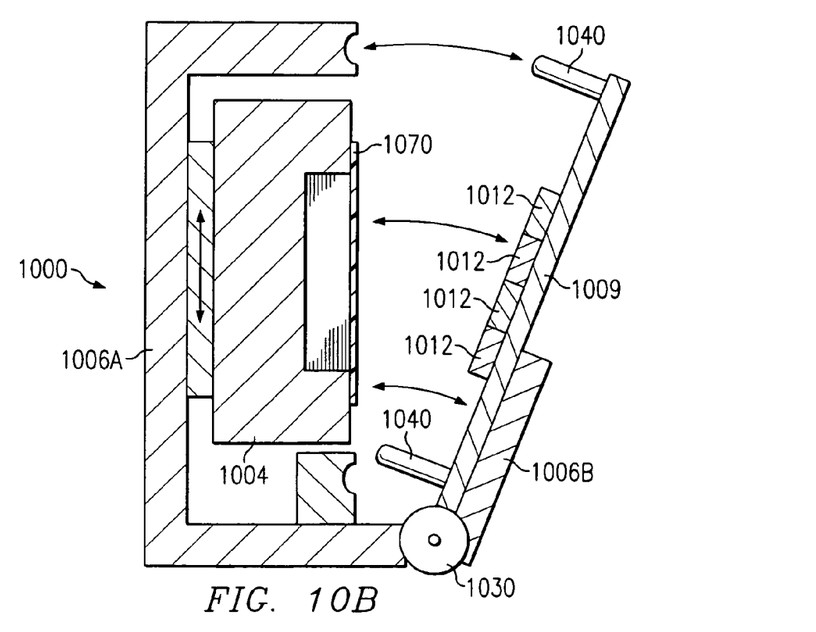

FIGS. 10A and 10B depict a magnetic head assembly in a back side configuration and in the open and closed positions, utilizing a rotary actuator in accordance with a preferred embodiment of the present invention. FIG. 10A is a side view of assembly 1000, showing a cross section through the center of head 1004. Assembly 1000 comprises a plurality of servo modules 1012 emitting optical beams 1010 onto the back of tape 1070. Assembly 1000 may also be equipped with two outboard servo modules (not shown), which project optical beams that do not project onto tape 1070 but, instead, project onto reference grates (not shown) located on the reference grate plate. Assembly 1000 is shown in the closed position, as described above in assembly 600. In a preferred embodiment of the present invention, the yoke is configured as two cooperating yoke assemblies, head yoke 1006A and module yoke 1006B. Head yoke 1006A and module yoke 1006B meet at rotary actuator 1030, where module yoke 1006B can be suitably opened away from head yoke 1006A by activating rotary actuator 1030, as shown in FIG. 10B. The positional accuracy of the module assembly may be lessened by the insertion of the actuator, but alignment features can be included to overcome this. Assembly 1000 also includes alignment pins 1040 for aligning module yoke 1006B with head yoke 1006A in the closed position. In FIG. 10, the outboard gratings and modules have been omitted for simplicity, but in practice, they remain a part of assembly 1000. Note again that the additional mass of the opening actuator is not added to magnetic head 1004 but, instead, is affixed between head yoke 1006A and module yoke 1006B.

The description of the present invention has been presented for purposes of illustration and description but is not intended to be exhaustive or limited to the invention in the form disclosed. Many modifications and variations will be apparent to those of ordinary skill in the art. For example, the tracking method described here is independent of the magnetic format and head structure, and can generate a position error signal without encoding on the servo track. However, modulation and encoding can be added to increase function and reliability if desired.

The embodiment was chosen and described in order to best explain the principles of the invention and the practical application, and to enable others of ordinary skill in the art to understand the invention for various embodiments with various modifications as are suited to the particular use contemplated.

What is claimed is:

1. A compact optical tracking system for magnetic tape, comprising:
   a magnet head assembly;
   a positioning actuator for changing the position of the magnetic head assembly; and
   an optical servo module structure for outputting a position signal to the positioning actuator, causing the positioning actuator to change a position of the magnetic bead assembly, wherein the optical servo module structure comprises at least two optical servo modules, each comprising:
   an optical beam source for emitting an optical beam;
   at least a first and second detector for detecting an optical beam reflection, wherein the first detector detects a first spot and the second detector detects a second spot, the second spot being offset from the first spot in a transverse direction by approximately one-quarter of a track spacing between successive tracks on the recording medium; and an optical beam interference composition for interfering with the optical beam and producing a predetermined pattern on a target.

2. A compact optical tracking system for magnetic tape, comprising:

a magnetic head assembly;

a positioning actuator for changing the position of the magnetic head assembly; and an optical servo module structure for outputting a position signal to the positioning actuator, causing the positioning actuator to change a position of the magnetic head assembly, wherein the optical servo module structure comprises at least one optical servo module, comprising:

an optical beam source for emitting an optical beam;

a detector for detecting an optical beam reflection; and an optical beam interference composition for interfering with the optical beam and producing a predetermined pattern on a target;

wherein each optical servo module contains at least a first and second detector for detecting an optical beam reflection;

wherein the optical servo module structure comprises a plurality of optical servo modules;

further comprising a yoke assembly, wherein the optical servo module structure is affixed to a yoke assembly, and the optical servo module structure faces a back side of the magnetic tape;

further comprising a grating assembly, wherein the grating assembly comprises at least one reference grating used as a target for the predetermined pattern emitted from the optical source within the optical servo module;

further comprising an outboard reference grating on the grating assembly, wherein the outboard reference grating is affixed to the grating assembly past the extent of the magnetic tape; and an outboard servo module, wherein the predetermined pattern emitted from the optical source within the outboard servo module uses the outboard reference grating as a target.

3. The compact optical tracking system recited in claim 2, wherein the positioning actuator is configured between the yoke assembly and the magnetic head assembly, and wherein only the magnetic head assembly is moved by the positioning actuator.

4. The compact optical tracking system recited in claim 2, wherein the positioning actuator is configured adjacent to both the yoke assembly and the magnetic head assembly, wherein the yoke assembly and the magnetic head assembly are moved by the positioning actuator.

5. The compact optical tracking system recited in claim 2, wherein one of the reference grating and outboard reference grating contain a reference index on the reference grating.

6. The compact optical tracking system recited in claim 5, further comprising:

a fine positioning actuator for adjusting the magnetic head assembly relative to the reference index on one of the reference grating and the outboard reference grating.

7. The compact optical tracking system recited in claim 2, wherein the grating assembly is affixed to the magnetic head assembly between the read and write heads.

8. The compact optical tracking system recited in claim 2, wherein the outboard reference grating is affixed adjacent to one of the read and write heads.

9. The compact optical tracking system recited in claim 2, further comprising:

a fine positioning actuator for adjusting the magnetic head assembly relative to one of the reference grating and the outboard reference grating.

10. The compact optical tracking system recited in claim 2, further comprising:

a linear actuator for loading magnetic tape onto the magnetic head assembly.

11. The compact optical tracking system recited in claim 2, further comprising:

a rotary actuator for loading magnetic tape onto the magnetic bead assembly.

12. An optical tracking system for aligning a recording medium, comprising;

at least one source of coherent electromagnetic radiation;

an interference generating device;

wherein the interference generating device causes superimposition of coherent radiation emitted from the at least one source to form at least two spots on the recording medium;

wherein the two spots are formed at different distances from a track on the recording medium;

wherein the direction and magnitude of offset of the track is determined based on the relative locations of the at least two spots with respect to the track, wherein the at least two spots comprise a first group of spots and a second group of spots, wherein the intensity of the first group of spots is averaged and the intensity of the second group of spots is averaged.

* * * * *